United States Patent [19]

Aoyama et al.

[11] Patent Number: 4,964,035
[45] Date of Patent: Oct. 16, 1990

[54] VECTOR PROCESSOR CAPABLE OF HIGH-SPEED ACCESS TO PROCESSING RESULTS FROM SCALAR PROCESSOR

[75] Inventors: Tomoo Aoyama; Hiroshi Murayama, both of Hadano, Japan

[73] Assignees: Hitachi, Ltd.; Hitachi Computer Engineering Co., Ltd., both of Tokyo, Japan

[21] Appl. No.: 178,569

[22] Filed: Apr. 7, 1988

[30] Foreign Application Priority Data

Apr. 10, 1987 [JP] Japan .................. 62-86893

[51] Int. Cl.⁵ .................. G06F 15/347; G06F 15/16; G06F 9/38
[52] U.S. Cl. .................. 364/200; 364/900; 364/232.21; 364/228.1; 364/265.4; 364/931.51
[58] Field of Search ... 364/200 MS File, 900 MS File

[56] References Cited

U.S. PATENT DOCUMENTS

| 4,149,243 | 4/1979 | Wallis | 364/200 |
| 4,395,757 | 7/1983 | Bienvem et al. | 364/200 |
| 4,541,046 | 9/1985 | Nagashima et al. | 364/200 |
| 4,641,275 | 2/1987 | Hatakeyama et al. | 364/900 |
| 4,661,900 | 4/1987 | Chen et al. | 364/200 |
| 4,780,811 | 10/1988 | Aoyama et al. | 364/200 |
| 4,789,925 | 12/1988 | Lahti | 364/200 |
| 4,890,220 | 12/1989 | Nakagawa et al. | 364/200 |

OTHER PUBLICATIONS

The IBM System/370 Vector Architecture: Design Considerations, IEEE Transactions on Computers, vol. 37, No. 5, May 1988.

Primary Examiner—Michael R. Fleming
Assistant Examiner—Gopal C. Ray
Attorney, Agent, or Firm—Fay, Sharpe, Beall, Fagan, Minnich & McKee

[57] ABSTRACT

A vector processing system having a main storage, a vector processor, a scalar processor, and an address translation mechanism in each processor in which data is stored in the main processor. The vector processing system includes a common memory in which processing results of vector data can be directly stored from resources such as arithmetic circuits and an operand fetch logic in the vector processor without using the address translation mechanism and from which data can be directly read out by the resources in the scalar processor without using the address translation mechanism, a common memory access control circuit for controlling the conflict among access requests issued from a plurality of resources in the processors and for controlling the access right through an assignment of a block number in a unit of a logical partition of the common memory, and a circuit for controlling, depending on set information held in the control circuit, a decode operation of an instruction specifying operations of the scalar and vector processors.

7 Claims, 7 Drawing Sheets

VECTOR PROCESSOR CAPABLE OF HIGH-SPEED ACCESS TO PROCESSING RESULTS FROM SCALAR PROCESSOR

BACKGROUND OF THE INVENTION

The present invention relates to a vector processor of a kind associated with an address translation therein, and in particular, to a buffer storage control of a scalar processor in the vector processor of said kind.

Conventionally, the vector processor is provided with a scalar processor therein and with a buffer storage to increase the processing speed of the scalar processor in many cases. The scalar arithmetic section is connected via the buffer storage to the main storage as described in "Super Computer SX System with Maximum 1.3 GFLOPS and Machine Cycle of 6 ns", Furukatsu, Watanabe, and Kondo; Nikkei Electronics Nov. 19, 1984; pp. 237-272.

With the provision of the logical constitution above, the scalar arithmetic section is capable of reading or writing operands of an arithmetic operation and a processing result from or into the buffer storage and hence the scalar processing speed is expected to be increased. The vector processor is provided with a vector processing function such that portions of the program for which the vector processing is possible and the remaining portions thereof are processed in the vector processor and the scalar processor, respectively. Consequently, it is considered that the processing speed of the program can be improved by increasing the processing performance of the respective processors. This forecast is appropriate if there does not exist any interaction between the vector processing and the scalar processing. In general, however, there exists an interaction therebetween and hence the forecast above is not correct in some cases depending on the algrorithm.

Next, description will be given of the interaction between the vector processing and the scalar processing.

In a DO loop, if there does not exist any dependence relationship between a control variable of the DO loop and each processing therein, the DO loop is considered to be subjected to a vector processing. On the other hand, if the dependence relationship is found in the processing of the DO loop, the vector processing is impossible or the DO loop is called a scalar-type DO loop. In some scalar-type DO loop, the vector processing is possible in a partial processing of the DO loop. The DO loop of this type is called a partially vectorizable loop. The following DO loop of a FORTNAN program can be partially vectorized, namely, this DO loop is a partially vectorized loop.

```
       DO10C I = 1, N               1
          IX = R1 (I)               2
          IY = R2 (I)               3
          A(IX, IY) = A(IX, IY) + S(I)  4
       100 CONTINUE                 5
```

The loop above is rewritten by use of a machine language as follows.

| | |
|---|---|
| Set Vector length 'N' | (a) |
| Vector Load VR (vector register) 0 ← R1 | (b) |
| Convert real to integer VR1 ← VR0 | |
| *-continued* | |
| Vector Load VR2 ← R2 | (c) |
| Convert real to integer VR3 ← VR2 | |
| Vector Subtract VR4 ← VR3 − '1' | (d) |
| Vector Multiply VR5 ← VR4 * M | M indicates the dimension of the array A. |
| Vector Add VR6 ← VR5 + VR1 | |
| Vector Store VR6 → ADRS (work address rector) | |
| Post | (e) |
| Load GR (general register) ← base (ADRS) | |
| Load Gr11 ← base (A) | (f) |
| Load Gr12 ← base (S) | |
| Subtract GR9 ← GR9 − GR9 | |
| Wait | (g) |
| LBL (Label): | |
| Load GR8 ← ADRS  (base = GR10, index = GR9) | (h) |
| Load GR7 ← A  (base = GR11, index = GR8) | (i) |
| Add GR7 ← GR7 + S  (base = GR12, index = GR9) | (j) |
| Store GR7 → A  (base = GR11, index = GR8) | (k) |
| Add GR9 ← GR9 + '1' | (l) |
| BCT (branch), LBL | (m) |

In the example above, (a) indicates an operation to set the number of vector processing elements to the vector processor and (b) designates a processing of a type conversion on vector data R1. In addition, (b) corresponds to processing ② of the FORTRAN program, (c) denotes a type conversion processing of a vector Rs, (d) stands for a processing to compute an indirect address of an array A and to store the computed address in a work vector ADRS, and (g) indicates to wait for the completion of the processing of which the execution is initiated prior to the instruction (b). When compared with a scalar instruction, a vector instruction requires a processing time corresponding to the processing elements. Consequently, there is not adopted, in many cases, a control procedure to execute a vector instruction after the completion of the preceding instruction, namely, the processing is controlled such that a concurrent processing is effected for a plurality of vector instructions which can be logically executed. Description will be here given on the assumption that there is provided a vector processor capable of the latter control. A group of instructions (f) between the instructions (e) and (g) are executed so as to be overlapped with an execution stage of the vector instruction (d). The scalar processing from (h) to (m) is achieved to add a vector S to the array A by use of an indirect addressing. Since the value of an index irregularly varies due to the indirect addressing, the dependence relationship of data is established with respect to the DO control variable, and hence the vector processing is impossible in this processing example. Incidentally, the instructions (c) and (d) and (h to 1) respectively correspond to ③ and ④ and of the FORTRAN program. Namely, the FORTRAN loop is a partially vectorizable loop. In this loop, the vector processing and the scalar processing have an interaction in which address data is passed from the vector processor to the scalar processor via the work vector ADRS.

FIG. 2 shows the processing concept of the vector processor associated with a data transfer between the vector processor and the scalar processor. In FIG. 2, a vector arithmetic or logic operation is accomplished between a vector arithmetic unit 501 and a vector register 502. In the case where a result of a vector arithmetic operation is stored in a main storage 700, a store address is processed by a logical (L)-real (R) address translation unit 503 in a vector processor 500 so as to be translated from a logical address into a real address. Data to be stored is stored from the vector register 502 into the main storage (MS) at a real address generated by the address translation unit 503. At the same time, a store real address is transmitted from the address translation unit 503 to an address array section 605 controlling read address information of data in a buffer storage (BS) 602 in a scalar processor 600. The address array section 605 compares the address where the store data has been written in the main storage 700 with an address in the buffer storage 602. When a matching condition is found as a result of the comparison, a buffer cancel request is transmitted to an address translation table 603. A scalar arithmetic operation is accomplished between a scalar arithmetic unit 601 and the buffer storage 602. If data necessary for the arithmetic operation is missing in the address translation table 603, a data read request is issued via an address translation logic 604 to the main storage. This is because the (L) read request passes through the address translation table 603 so as to be issued to the address translation logic 604 if the logical address is not registered as an entry in the address translation table 603. Data read out from the main storage 700 is stored in the buffer storage; furthermore, the address array and the address translation table 603 are updated.

As described above, due to a read request issued from the scalar processor 600 to access the area of the main storage 700 where the data has been written by the vector processor 500, the processing speed cannot be increased in the scalar arithmetic operation to access the data by use of the buffer storage 602.

In contrast with the processing above, in the case where the vector processor 500 reads data from the area of the main storage 700 in which the data has been written by the scalar processor 600, if a storethrough method of a type in which the data write operation is effected on the buffer storage 602 and the main storage 700 at the same time is adopted, the operation to read the vector data is not hindered because information of the buffer storage 602 is reflected on the main storage 700. However, in the case of a store-in method in which the store data is not written in the main storage 700 and is only written in the buffer storage 602, a considerable period of time is required to read the vector data.

SUMMARY OF THE INVENTION

It is therefore an object of the present invention to provide a vector processing system in which a scalar processor is capable of reading at a high speed a result of a processing effected by a vector processor.

In the vector processing system, the operation of the scalar processor to read information written by the vector processor is delayed primarily due to the following reasons.

(1) A long period of time is necessary for address translation in the vector store processing, and
(2) A considerable period of time is required for the buffer cancel processing in the case where data of a vector store area exists in the buffer storage.

In order to remove these delay causes, the vector processing system according to the present invention includes common or shared store means (for example, 800 of FIG. 1) accessible by use of resources of the scalar and vector processor without an address translation processing, control store means for controlling a collision or conflict among access requests to the common store means issued from a plurality of resources in the scalar and vector processors and for controlling an access right for each logical partition of the common store means, and means (for example, 810 of FIG. 1) for controlling a decode operation of an instruction specifying operations of the scalar and vector processors.

The logical partition unit of the store means here is defined as follows, namely, (1) an area of the store means capable of holding vector data comprising a plurality of elements and (2) the area can be specified by an operand field of an instruction.

In significance, when an access request is issued to the common store means, the access right to the store means is controlled, so that a data communication between the vector processor and the scalar processor can be performed at a high speed without the address translation.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
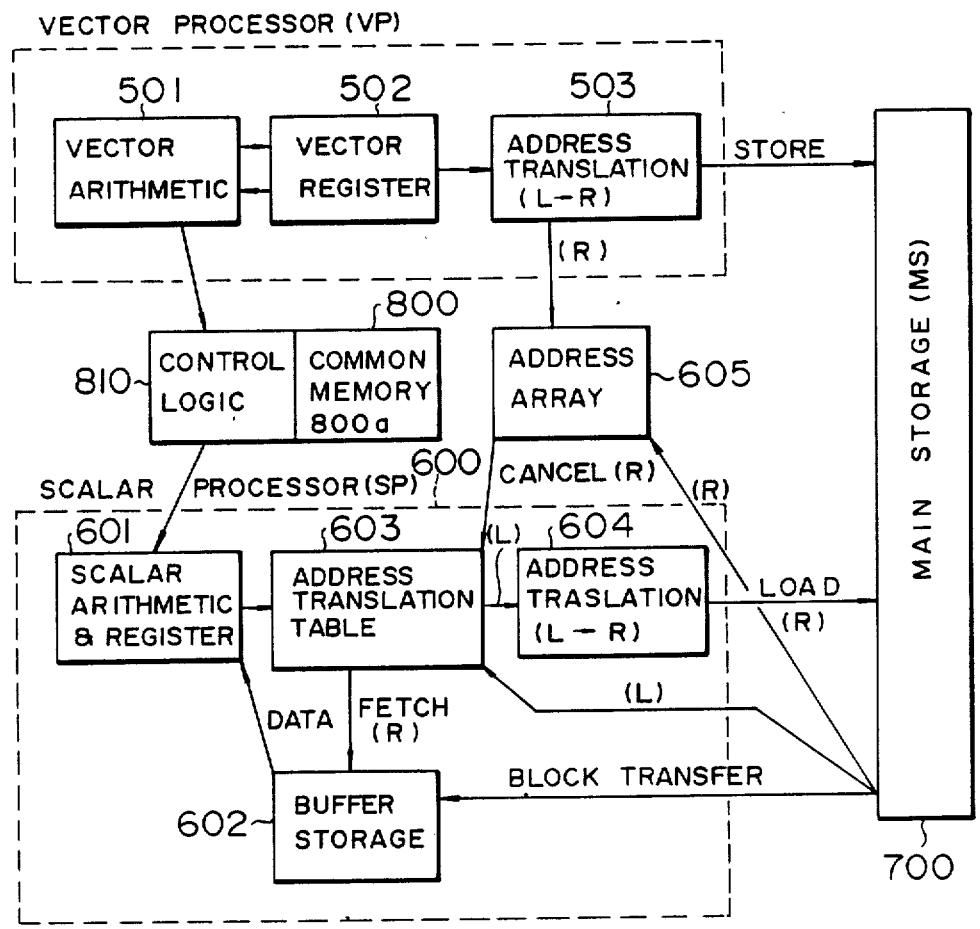
FIG. 1 is a block diagram schematically showing the concept of the vector processing system according to an embodiment of the present invention.

Referring now to the drawings, description will be given of an embodiment according to the present invention.

Figure 2:
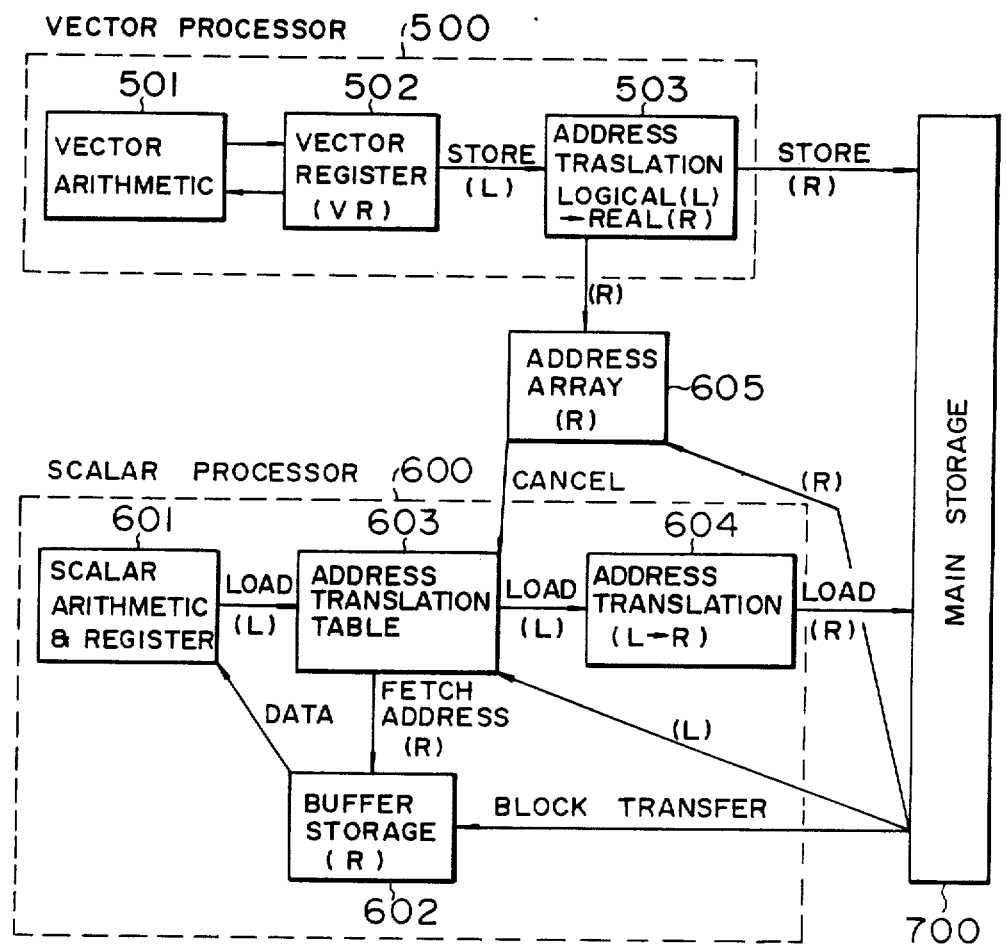
FIG. 2 is a block diagram for explaining the concept of the buffer storage control according to a prior-art vector processing system.

FIG. 1 shows the general concept of the vector processing system according to the present invention, whereas FIG. 2 shows a schematic diagram for explaining the prior-art system in contrast therewith. Consequently, in these configurations, the similar components are assigned with the same reference numerals.

In FIG. 1, the vector processing system as an embodiment comprises a common memory 800 having a common data store area which can be directly accessed without an address translation processing from resources belonging to and located between a vector processor 500 and a scalar processor 600, a control information store section 800a disposed in an area of the common memory 800 for controlling an access right employed to control a contention or conflict among access requests to the common data store area from a plurality of resources in the vector and scalar processors, and an instruction decode control logic 810 operative based on information supplied from the control information store section 800a for controlling an operation to decode instruction specifying operations of the scalar processor 600 and the vector processor 500.

Figure 3:
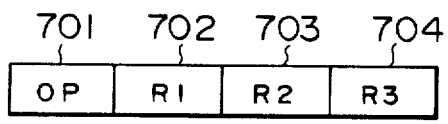
FIG. 3 is a format diagram instantiating a vector instruction employed according to the present invention.

FIG. 3 shows an example of a vector instruction in which reference numeral 701 indicates an operation field and reference numerals 702 to 704 designate operand fields. The operation field and the operand fields respectively specify a resource and a vector register number or an identification number of a logical partition of the store means.

Next, a concrete representation of an example a vector instruction will be described in which data of a vector register is stored in the common memory. In FIG. 3, the processing is indicated by the operation field 701, a vector register number is loaded in the R1 field 702, and an identification number of a logical partition of the common storage is designated by the R2 field 703. The R3 field is ignored. The specifications above define an access to the common memory by the vector instruction.

Figure 4:
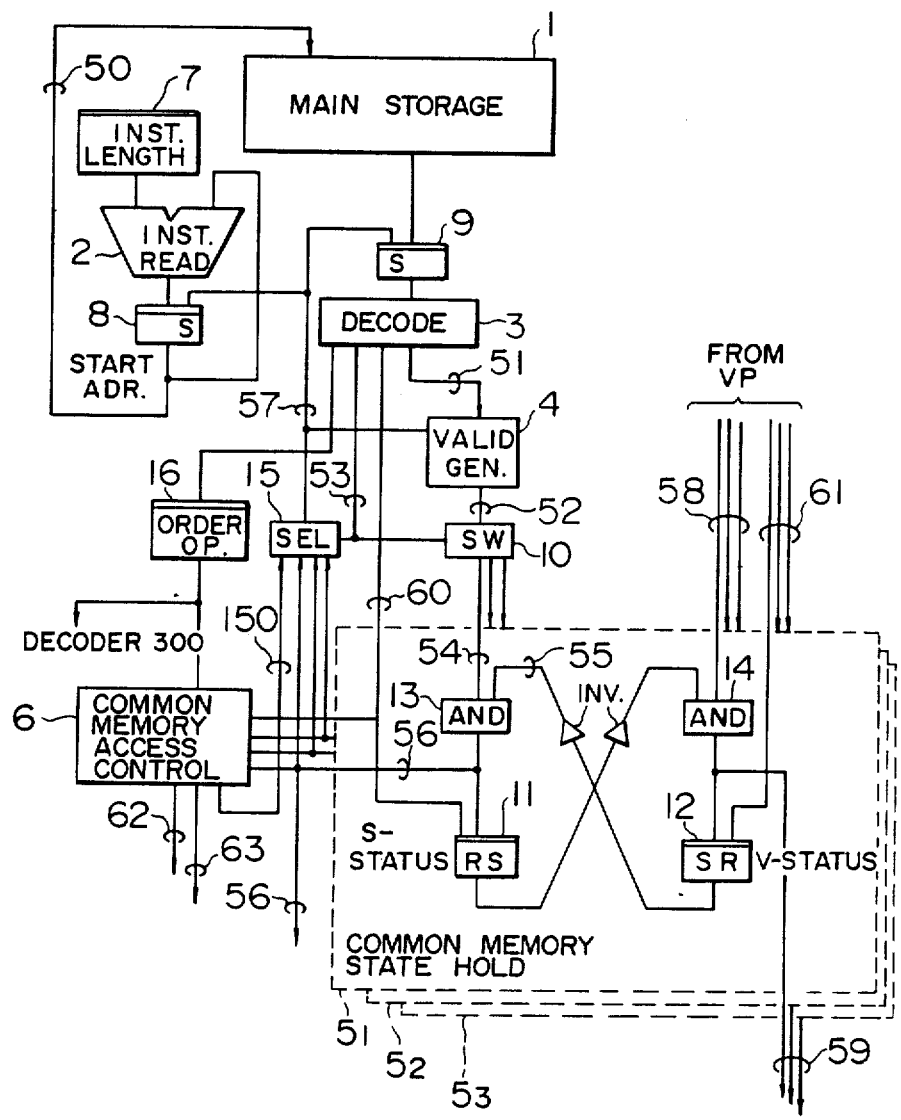
FIG. 4 is a block diagram showing the common storage access control section of an embodiment according to the present invention.

FIG. 4 is a block diagram showing an example of the instruction execute control section in the scalar processor of the vector processing system according to the present invention. The system of FIG. 4 includes a main storage 1 (corresponding to 700 of FIG. 1), an adder 2 for a read operation of a scalar instruction, a decoder 3, a valid signal generator 4, common memory state hold circuit $5i$ ($i=1, 2, 3$), and a common memory access control circuit 6. In FIG. 4, for simplification of the block diagram, the common memory is assumed to be constituted with three blocks which can be logically accessed in an independent fashion and which correspond to three vector registers as an instantiation. An arbitrary number of blocks may be included in the common memory according to the present invention. Incidentally, reference numerals 800a and 810 of FIG. 1 correspond to the common memory state hold circuits $5_1$, $5_2$, and $5_3$ and the common memory access control circuit 6, respectively.

It is assumed in FIG. 4 that a scalar instruction length and a scalar instruction in the main storage 1 are held in registers 7 and 8, respectively. When the vector processing system is initiated, a scalar instruction address is transmitted via a path 50 to the main storage 1. The instruction read from the main storage is set to a register 9 and is then decoded by the decoder 3. When it is found by the decoder 3 that the instruction in the register 9 is an instruction which tests and locks the state of the common memory, the valid signal generator 4 is activated via the path 51. The valid signal generator 4 transmits a valid signal to a path 52 for each machine cycle. Through a path 53, a signal indicating an n-th common memory is sent to a switching circuit 10 such that the valid signal on the path 52 is delivered to the common memory state hold circuit $5i$ of an objective common memory according to information accessing the n-th common memory specified by an operand of the common memory test and lock instruction in the register 9.

A flip-flop circuit 11 in the common memory state hold circuit $5_i$ indicates an access scalar processor to the common memory. Namely, '0' denotes that the scalar processor is not effecting an access thereto, whereas '1' designates that the access is in process. A flip-flop 12 indicates an access state of the vector processor. The meanings of the state of the flip-flop 12 are the same as those of the flip-flop 11 on the side of the scalar processor. The flip-flops 11 and 12 are both initially set to '0' and are associated with an access right field of the common memory.

When an access request on the scalar processor side is transmitted via a path 54, the flip-flop 11 is set to '1' via an AND circuit 13 (the signal value on a path 55 is initially set to '1'). At the same time, the signal on a path 56 is delivered to the common memory access control circuit 6 and a selector 15.

An output from the selector is fed as a set signal via a path 57 to the registers 8 and 9. Namely, when the scalar instruction attains a right to access the common memory, it is enabled to set the address of the next scalar instruction and to set the scalar instruction to the register 9. Furthermore, the operation of the valid signal generator 4 is suppressed by means of a signal on the path 57.

When the common memory is being accessed by the vector processor, the state of the flip-flop 12 is indicated as '1'. The operation to set the flip-flop 12 on the vector processor side is effected in a similar fashion as for the operation of the scalar processor side. When the flip-flop 12 is in the state of '1', an inverter INV causes the signal value on the path 55 to be set to '0'. As a result, a logical product is obtained through the AND circuit 13 and hence the test and lock processing is not allowed for the scalar processor. In this situation, the test and lock processing of the scalar processor is accomplished again in the next machine cycle.

The common memory state hold circuits $5_1$, $5_2$, and $5_3$ are configured in a complementary fashion with respect to access requests of the scalar and vector processors. In a consequence, while the scalar processor is effecting the common memory access, an answer signal on a path 59 becomes to be '0' for an access request signal issued via a path 58 from the vector processor.

When a scalar instruction in the register 9 is to release the lock of the common memory, the decoder 3 sends a reset signal to path 60. The components of the path 60 are provided as many as there are common memories and hence constitute a group path, which is indicated with a bold line in FIG. 4 for simplification of the block diagram. The operation above resets the flip-flop 11 holding the access state of the scalar processor. Furthermore, the flop-flip 12 holding the access state of the vector processor is reset via a path 61 from the vector processor.

After the common memory test and lock instruction is processed by the scalar processor, if a scalar instruction accessing the common memory is set to the register 9, detailed information specifying the operation of the pertinent instruction is loaded in a register 16. The detailed information is checked by the common memory access control circuit 6 such that an instruction is issued via a path 62 to resources such as arithmetic circuits and an operand fetch logic in the scalar processor. Namely, the access control circuit 6 including a switching circuit in the resource issues an instruction signal such that an order is delivered so as to link a path between the pertinent resource and the associated common memory, thereby enabling the common memory to be accessed via a path 63.

Figure 5:
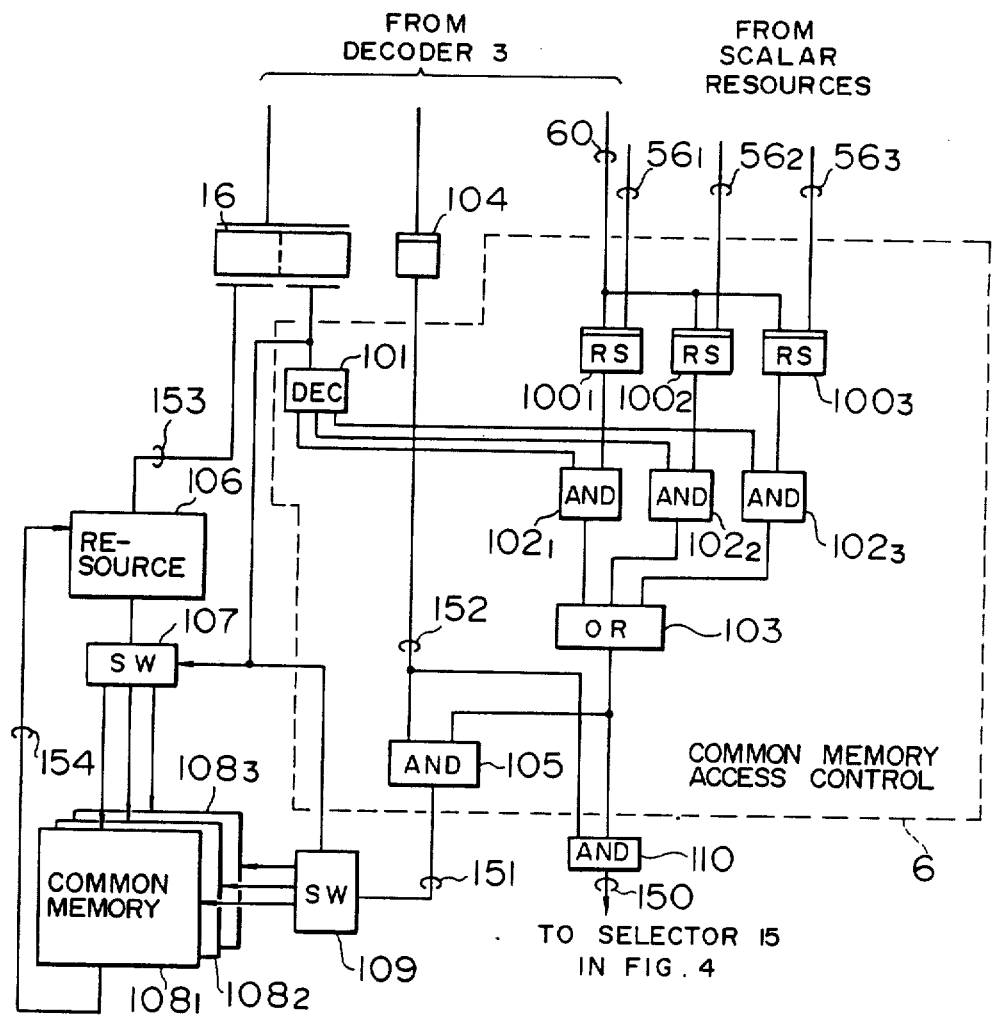
FIG. 5 is a block diagram of the common storage access control circuit in a scalar processor section.

FIG. 5 is a block diagram showing the common memory access control circuit 6 of which the components are partically duplicated with those of FIG. 4. Such duplicated components are assigned with the same reference numerals as those employed in FIG. 4. A portion 6 enclosed with dotted lines in FIG. 5 corresponds to the common memory access control circuit 6 of FIG. 4. The provision of the common memory access control circuit 6 on the scalar processor side results in a reduction of the accesses to the common memory state hold circuits $5i$ of FIG. 4 located at a location apart from the scalar processor in a sense of the mount position, thereby increasing the processing speed of the scalar instruction.

In FIG. 5, there are provided flip-flops $100_i$ (i=1, 2, 3), where the suffix i corresponds to the respective common memory. The state of '1' of the flip-flop $100_i$ indicates that the pertinent common memory is accessible from resources of the scalar processor, whereas '0' designates that the access is inhibited. The flip-flop $100_i$ is set with a signal on the path 56 outputted from the AND circuit 13 indicating a state of the associated common memory state hold circuit $5_i$ and is reset with a signal deliverd from the decoder 3 onto the path 60. Through the reset operation, the values of the flip-flops $100_i$, $100_2$, and $100_3$ are caused to be '1' indicating that the accesses from the resources of the scalar processor are allowed.

A code included in the detailed information of the instruction set to the register 16 to designate one of the common memories to be accessed is decoded by a decoder 101 and is then delivered to AND circuits $102_i$ (i=1, 2, 3). In the AND circuits $102_i$, logical product are attained between the code and outputs from the flip-flop $100_i$, and then the resultant values are ORed in an OR circuit 103. Arbitrary two outputs selected from the outputs from the AND circuits $102_1$, $102_2$, and $102_3$ cannot be simultaneously set to '1'. An output from the OR circuit 103 is delivered as an input to an AND circuit 110 of which the other input is a signal from a path 152, and the AND circuit 110 produces an output signal to the selector 15 of FIG. 4. When the decoder 3 of FIG. 4 decodes a common memory access instruction, the path 150 is connected to the path 57 by use of the path 53. Namely, when a common memory access is attempted and an execution of the scalar instruction is allowed, an instruction for preparation of the subsequent scalar instruction is transmitted onto the path 57. When detailed information is loaded in the register 16, the decoder 3 sets an indication signal designating that the pertinent information is valid to the register 104. An output from the register 104 is delivered via the path 152 to the AND circuit 105 in which a logical product is attained between the output and a common memory access enable signal. An output from the AND circuit 105 is then fed to the path 151.

Of the detailed information set to the register 16, information specifying the operations of arithmetic circuits and the like of the scalar processor is fed via the path 153 to resources 106 of the processor. A common area memory access request issued from the resources 106 is delivered via the switching circuit 107 to an objective common memory $108_i$ (i=1, 2, 3). When an access request issued from the resources 106 indicates a read request, a signal read from the common memory $108_i$ is transmitted via the path 154 to the resources 106. A signal on the path 151 indicates that the request from the resources 106 is valid for the scalar access instruction. This signal is sent via the switching 109 to the common memory $108_i$ indicating the scalar access instruction.

Figure 6:
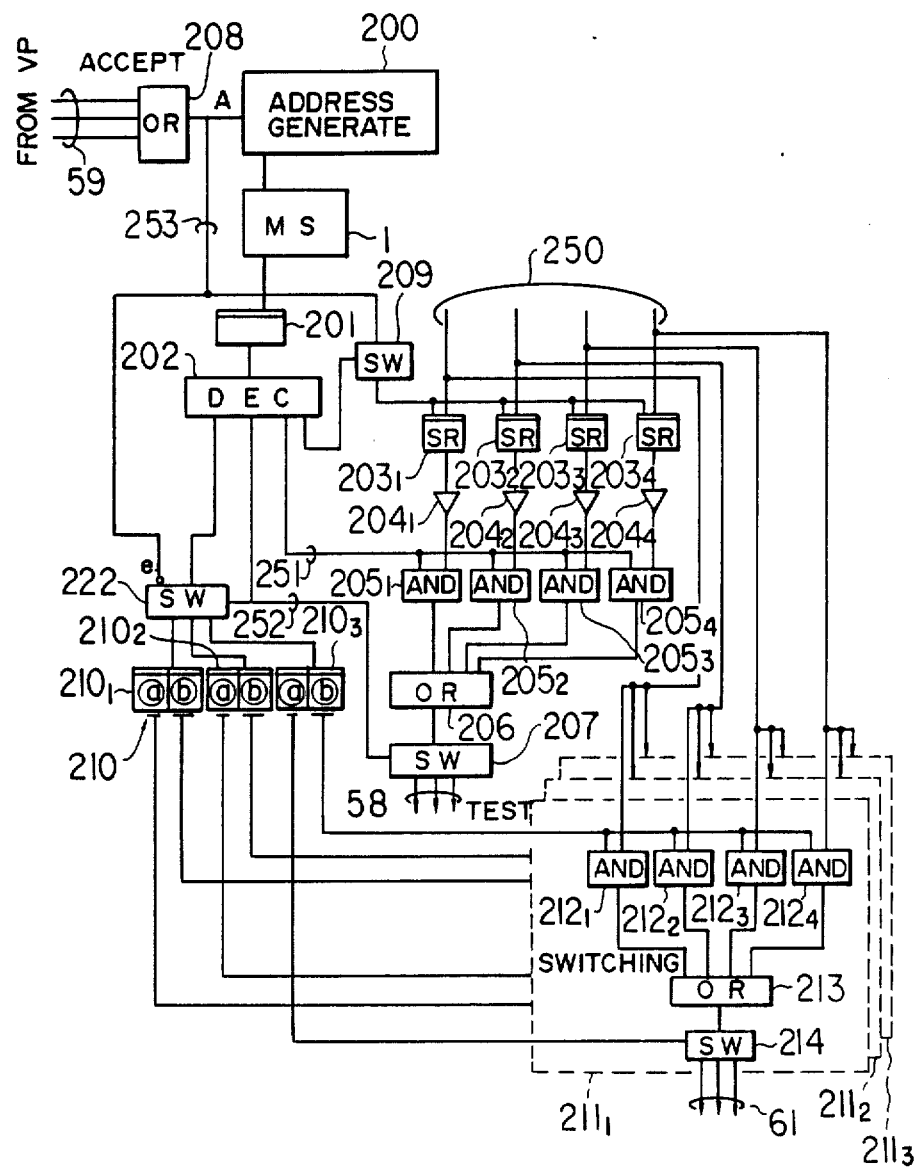
FIG. 6 is a block diagram showing a resource state control and instruction initiate section of a vector processor section.

FIG. 6 is a block diagram showing the common memory access control circuit in the vector instruction decode section of the vector processor.

In the configuration of FIG. 6, reference numeral 200 designates an address generate circuit for a vector instruction read operation. The address generate circuit 200 is configured in the same fashion as the scalar instruction read circuit (including the address adder 2 and the registers 7 and 8) of FIG. 4. An address generated by the vector instruction address generate circuit 200 is sent to the main storage 1, and a vector instruction read from the main storage 1 is set to a register 201. The vector instruction in the register 201 is then decoded by a decoder 202. Flip-flops $203_k$ (k=1, 2, 3) hold states of resources in the vector processor. Namely, when the flip-flop state is '1' it is indicated that the pertinent resource is processing a vector instruction, whereas the state of '0' denotes that the vector instruction can be processed. In FIG. 6, the flip-flops $203_k$ corresponds to the resources, respectively. For simplification of the block diagram, the number of resources is set as k=4 as an example; however, an arbitrary number at least four may be specified. The flip-flops $203_k$ are reset with a signal on a path 250, the signal transmitted when the associated resource completes processing of a vector instruction.

Output from the flip-flops $203_k$ are inputted via inverters $204_k$ (k=1, 2, 3) to AND circuits $205_k$, respectively. On the other hand, a resource necessary to execute the vector instruction in the register 201 is identified by the decoder 202, which then causes a resource request signal to be sent to a path 251. A logical product is computed by AND circuit $205_k$ (k=1, 2, 3, 4) between the resource request signal and the outputs from an inverters $204_k$. Two or more output signals from the AND circuits $205_k$ cannot be set to '1' at the same time. Outputs from the AND circuits $205_k$ are supplied to an OR circuit 206 so as to attain a logical sum thereof, and the resulant value is transmitted to a switching circuit 207.

On the other hand, when a vector instruction in the register 201 requests an access to the common memory, the decoder 202 identifies one of the common memories for the access so as to transmit a signal indicating the common memory to be accessed. This signal is supplied to the switching circuit 207 and is therefrom sent to a state control circuit ($5_i$ of FIG. 4) associated with the objective common memory. As already described in conjunction with FIG. 4, when the common memory to which the vector instruction request is issued is accessible, signals are issued onto the bus 59 to indicate the acceptance of the request. The logical sum of the accept signals is attained by an OR circuit 208. The path 59 corresponds to the number of common memories mounted in the vector processing system. There cannot occur a case where a plurality of signals on the path 59 are set to '1' at an arbitrary timing. An output from the OR circuit 208 is delivered via a path 253 to the vector instruction address generate circuit 200, which therefore generates an address of the next vector instruction. At the same time, a switching circuit 209 causes the contents of flip-flops associated with the resources necessary to execute the vector instruction to be set to '1'. Information about the common memory to be accessed by the vector instruction for which the execution has been enabled is simultaneously set to registers $210_i$ (i=1, 2, 3). The information includes ⓐ common memory number and an access order for the common memory and ⓑ an indication to a resource for which the vector instruction is to be executed. Each register $210_i$ of FIG. 6 is configured with two fields so as to clearly show the information structure above. A plurality of registers $210_i$ are provided corresponding to the common memories.

In FIG. 6, reference numeral $211_i$ (i=1, 2, 3) designate circuit sections to generate reset information for the common memories. In general, the circuits $211_i$ are conversion circuits for adjusting the difference between the number of vector resources and that of common memories. Information of the ⓑ field of the register $210_i$ is supplied to AND circuits $212_k$ (k=1, 2, 3, 4), which are disposed corresponding to the resources. When the execution of the vector instruction is completed, '1' is transmitted onto a path 250 disposed corresponding to the resources. In the AND circuits $212_k$, logical products are obtained between these signals and the resource indicate signals on the ⓑ fields of the registers $210_i$, respectively Outputs from the AND circuits $212_k$ are fed to an OR circuit 213, which then attain a logical sum thereof. The resultant signal is inputted to a switching circuit 214 so as to produce a reset signal for the common memory accessed by the vector instruction corresponding to the common memory.

Figure 7:
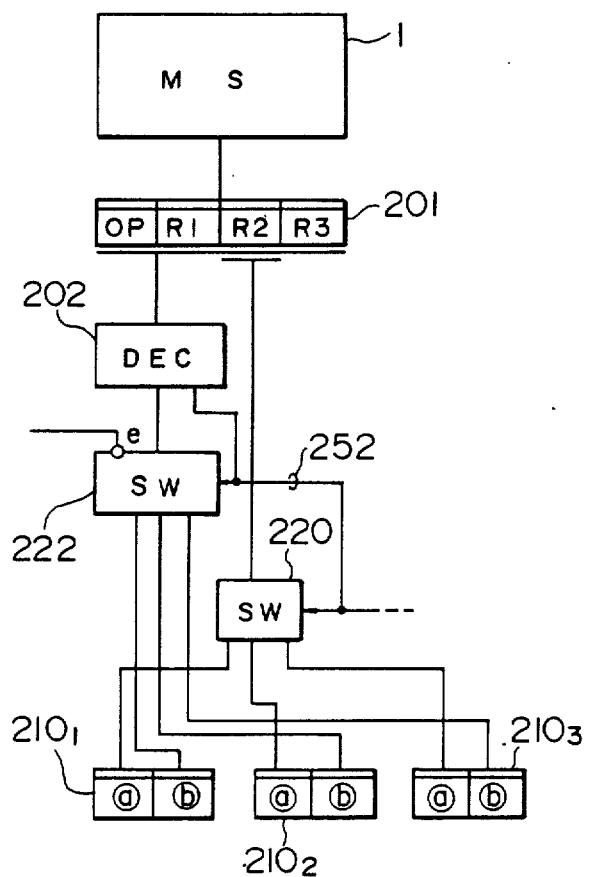
FIG. 7 is a schematic diagram showing in detail a partially modified constitution of FIG. 6.

FIG. 7 shows a circuit configuration example in which the circuit configuration of FIG. 6 is partially modified. In this constitution, the vector instruction of FIG. 3 is applied to the decoder 201 as instantiated in the field representation An output from the R2 field of the decoder 201 is delivered to a switching circuit 220, which produces outputs respectively connected to inputs of access order field ⓐ of each of the access information registers $210_1$, $210_2$, and $210_3$. Upon receiving a signal from a control path 252, the switching circuit 220 accomplishes a switching operation in synchronism with a switching circuit 222, thereby inputting the content of the R2 field of the decoder 201 into the ⓐ field of the pertinent access information register 210. The remaining circuit configurations are identical to those of FIG. 6.

Figure 8:
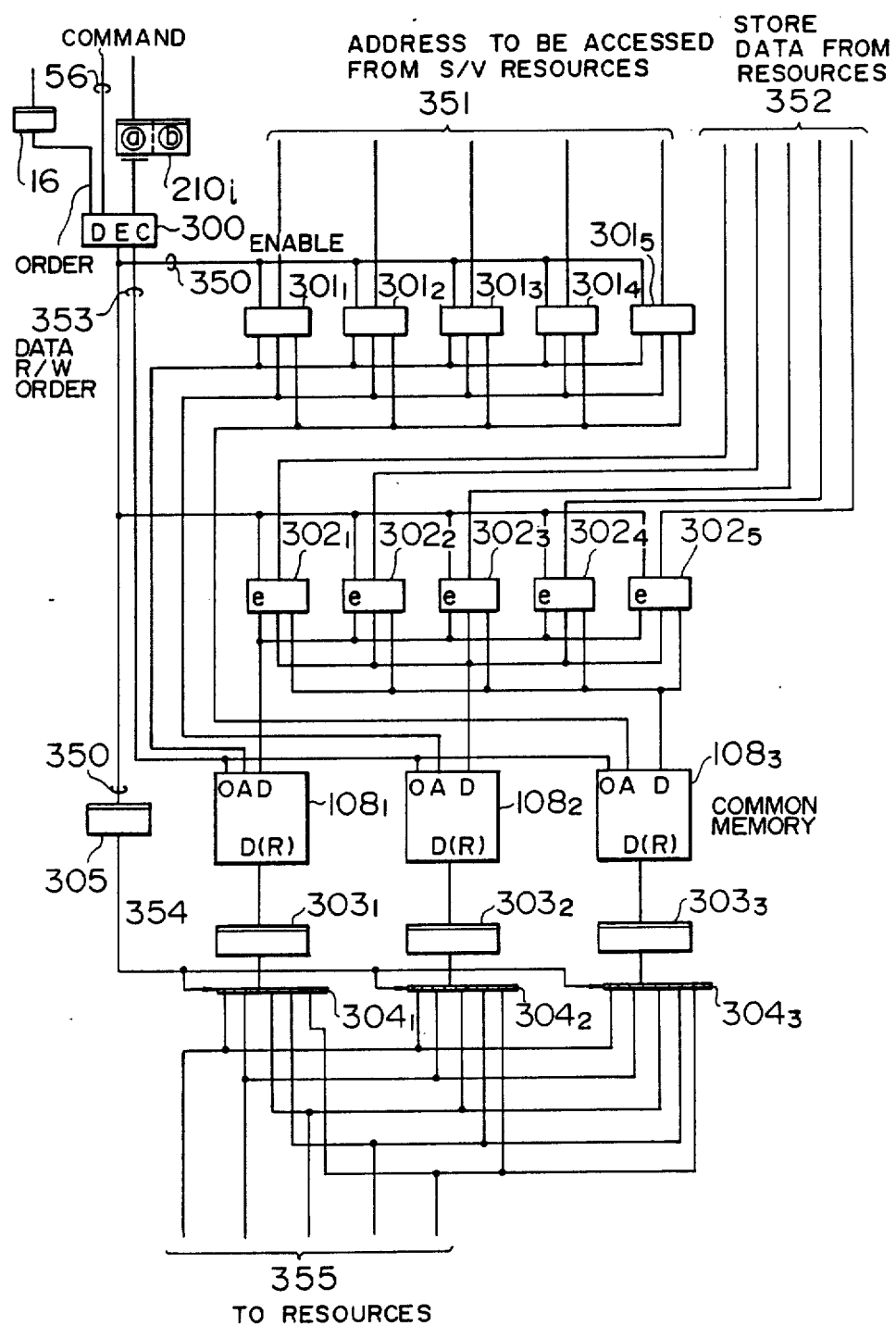
FIG. 8 is a schematic diagram for explaining a data access method on the common storage.

Referring now to FIG. 8, description will be given of the access method of the data in the common memory from the scalar and vector processors.

In FIG. 8, reference numerals $108_1$, $108_2$, and $108_3$ respectively denote common memories. Registers $210_i$ are loaded with decode information of vector instructions associated with resources which can access the common memories $108_i$ and which can execute vector instructions. The information items above are held in the registers $210_i$ until the vector instructions are completed. FIG. 8 shows a flow of data at an execution of an instruction selected from the vector instructions existing in the registers $210_i$ and the scalar instruction loaded in the register 9.

In the configuration of FIG. 8, a decoder 300 determined a common memory to be accessed depending on a common memory access request transmitted from the scalar processor onto the path 56 or a block number of a common memory corresponding to each request of the vector instructions of the registers $210_i$ so as to transmits an enable signal corresponding to an objective common memory. The enable signal is then sent to path 350. As already described in conjunction with FIG. 4, the system is controlled such that the common memories are not simultaneously accessed from a plurality of resources at an arbitrary timing. The path 350 is a group path. On the other hand, addresses of common memories to be accessed are sent from resources of the scalar and vector processors onto a path 351. The addresses are selected by switching circuits $301_1$, $301_2$, ..., $301_5$ and are then transmitted to the objective common memories When an instruction to access the common memory indicates a store operation, store data are transmitted from the resources of the scalar and vector processors to a path 352. The store data are selected by switching circuits $302_1$, $302_2$, ..., $302_5$ so as to be transmitted to the objective common memories. Reference numerals $108_1$, $108_2$, and $108_3$ respectively designate random access memory (RAM) elements implementing the common memories An order signal indicating whether or not data is written in these RAM elements is sent from the decoder 300 via a path 353.

When the order signal on the path 343 is an indication representing a read operation on the common memory, the data on the path 352 are ignored, namely, the data are not stored in the RAMs $108_1$, $108_2$, and $108_3$. Data read from the common memory are stored in registers $303_1$, $303_2$, and $303_3$ and are then transmitted via selectors $304_1$, $304_2$, and $304_3$ and a path 355 to the resources of the scalar and vector processors. For select information operating the selectors $304_1$, $304_2$, and $304_3$, a signal on the path 350 is temporarily kept in a register 305 so as to be transmitted to a path 354 in synchronism with the read timing of the RAM element $108_1$, $108_2$, and $108_3$.

Next, description will be given of an influence of the common memory adopted according to the present invention on the language specification as well as the effect of the common memory.

Since the common memory is not an address translation object, the program and the language compiler are required to pay attention thereto as an area unique to the user job. As a such a particular area other than the common memory, there exists an example of a local memory of a multiprocessor ("Super Computer Performance for Convolution", CH2216-0, 1985/IEEE). The local memory for a processor functions as a buffer memory which is controllable by the user. In contrast therewith, the common memory serves as a high-speed medium for a data transmission between processors having the different properties. However, the buffer memory and the common memory must be declared as areas, in the language specification, different from the variables and the like defined in the main storage. When a program description language is FORTRAN, it is advisable to adopt a method in which the common memory is defined by use of a COMMON statement with a name. When this method is applied, the program described in conjunction with the problems above is changes as follows.

```
    COMMON/CMAREA/ADRS (1000),
    SWORK (1000)
    DO100 I = 1, N
    IX = R1 (I)
    IY = R2 (I)
    ADRS (I) = (IY−1) * M + IX
100 SWORK (I) = S(I)
    DO120 I = 1, N
120 A(ADRS(I)) = A(ADRS(I)) + SWORK(I)
```

In this program, a particular COMMON name 'CMAREA' causes the program and the compiler to pay attention to the common memory, which is achieved through two operations as follows. That is, in the initial program loading (IPL) of an operating system (OS), the compiler can judge to determine the existence of the common memory because hardware information thereabout is supplied and the common memory area is located in tht common memory through a language specification of the compiler. In this program format, the program can be executed without any modification thereof even in a vector processing system not having the common memory. In this case, however, 'ADRS' and 'SWORK' areas are reserved in the main storage.

When the program is rewritten as describe above, the compiler need not judge to determine whether or not a vector processing is applicable to an arithmetic operation on the array A due to an inadequate data reference of the array 'A' (i.e. the array is inadequate to a vector processing). Consequently, there does not exist any fear that the vector processing is inappropriately suppressed because of the insufficient operation of the processing to discriminate the inadequate data reference operation. Furthermore, since the data items 'ADRS' and 'SWORK' generated by the vector processing can be referenced without accessing the main storage in the DO 120 loop of the next scalar processing, the reference frequency of references from the scalar processor side to the buffer memory can be reduced. As a result of the minimization of the buffer storage reference frequency, the operation speed to read a vector instruction can be substantially increased (in the vector processing system available at the present time, even a vector instruction is read out via a scalar buffer storage), and hence the effective processing performance of the overall vector processing system can be improved.

According to the embodiments of the present invention, in a vector processing system having a vector processor associated with an address translation for the main storage, there is provided store means accessible from resources of the scalar and vector processors without any address translation and the accesses from both processors are controlled appropriately, thereby increasing the speed of the data transmission between the scalar and vector processors.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. A vector processing system having a main storage, a scalar process for executing scalar instructions, a vector processor for executing vector instructions, and address translation units respectively provided in said processors to be respectively located between said processors and said main storage comprising:

common memory means having a plurality of logical partitions for storing vector data including a plurality of elements each representing a portion thereof specifiable by a given field of an instruction on data to be accessed, said common memory means being accessible from resources provided in each of said processors without intervention of said address translation units;

access control means cooperative with said common memory means for detecting a conflict between an access request issued from a resource of said vector processor and an access request issued from a resource in said scalar processor to said common memory means for providing one of said conflicting access requests with an access right for each of said logical partitions of said common memory means in accordance with a predetermined logic for access right; and decode control means responsive to said access control means for permitting a decode operation of an instruction defining operations of said scalar or said vector processor based on information of access right given to an access request held in said access control means to provide a decoded instruction to the respective resource for execution.

2. The vector processing system according to claim 1 further including means operative, when an instruction from said main storage is decoded in each said processor and the instruction is found to be an instruction to sense whether a relevant logical partition of said common memory means is available or not, for generating a signal indicating common memory means specified by the instruction, thereby transmitting said signal thus generated to said access control means.

3. The vector processing system according to claim 1 including a logic circuit capable of decoding a field of a vector instruction to specify a relevant resource in said vector processor and a block number representing said logical partition of said common memory means and sensing available states of said relevant resource in said vector processor and said common memory means based on an output therefrom.

4. The vector processing system according to claim 1 which includes means for identifying a logical partition of said common memory means with a block number by use of a field of an instruction from each of said processors, said logical partition thus identified, being capable of holding vector data including a plurality of elements, and means coupled between said identifying means and said common memory means, for establishing a processing path between a resource in said processor on which said instruction is to be executed and a logical partition corresponding to said block number.

5. The vector processing system according to claim 4 which includes a responding means for responding when said instruction of said processor is a vector instruction, said responding means specifying a store processing execution path between a resource in said vector processor on which an operation of said vector instruction is to be effected and a relevant logical partition of said common memory means corresponding to said block number.

6. The vector processing system according to claim 1 wherein said decode control means further includes a first decoder to decode a scalar instruction of said scalar processor and a second decoder to decode a vector instruction of said vector processor, said first and said second decoder being provided independently from each other, and first and second instruction registers connected to said first and second decoders, respectively, whereby said scalar processor and said vector processor are permitted to access said plurality of logical partitions of the common memory means in parallel relation to execute respective jobs of said scalar and vector processors by relevant resources thereof simultaneously.

7. A vector processing system having a scalar processor, a vector processor, and a main storage connected to said processors through address translation the system comprising:

common store means which can be accessed, from resources in said processors without an address translation processing;

control means cooperative with said common store means for detecting a conflict between access requests issued from a plurality of resources of said vector processors and access requests issued from a plurality of resources of said scalar processors to said common store means and for providing at least one of said conflicting access requests with an access right for a logical partition of said common store means; and decode means responsive to said control means for controlling a decode operation of an instruction defining operations of at least one of said scalar and vector processors based on information held in said control and store means said scalar processor includes a buffer memory for storing a copy of a portion of store data of said main storage, a plurality of resources of said scalar processor including at least arithmetic or logical operation units, an address translation table for translating an address of data from said resources, and an address translate means for translating a logical address from said address translation table into a real address and for loading the address in said main storage and said vector processor includes a plurality of resources, vector registers coupled with said resources, and address translate means for translating a store address associated with a result of the vector arithmetic or logic operation from a logical address into a real address and for storing the address in said main storage, said vector processing system including address array means for transmitting a buffer cancel request to said address translation table when the address written in said main storage matches with the address in said buffer memory.

* * * * *